(12) United States Patent
Nomura (10) Patent No.: US 7,944,634 B2
(45) Date of Patent: May 17, 2011

(54) SUPPORT STRUCTURE FOR LIGHT QUANTITY CONTROL UNIT OF LENS BARREL

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 248 days.

(21) Appl. No.: 12/265,132

(22) Filed: Nov. 5, 2008

(65) Prior Publication Data

US 2009/0122427 A1 May 14, 2009

(30) Foreign Application Priority Data

Nov. 9, 2007 (JP) ................................. 2007-291656
Jun. 27, 2008 (JP) ................................. 2008-168323

(51) Int. Cl.
*G02B 7/02* (2006.01)
(52) U.S. Cl. ......... 359/822; 359/738; 359/740; 359/817
(58) Field of Classification Search .................. 359/822, 359/738
See application file for complete search history.

(56) References Cited

U.S. PATENT DOCUMENTS

| | | | | |
|---|---|---|---|---|
| 3,981,565 | A * | 9/1976 | Karasawa | ..................... 359/234 |
| 6,738,568 | B1 | 5/2004 | Dirisio et al. | |
| 6,767,146 | B2 * | 7/2004 | Nishimoto | ..................... 396/463 |
| 2006/0007565 | A1 * | 1/2006 | Eto | ............................... 359/819 |
| 2006/0268430 | A1 | 11/2006 | Sasaki | |
| 2006/0268436 | A1 | 11/2006 | Sasaki | |
| 2006/0274430 | A1 | 12/2006 | Nomura | |
| 2006/0274435 | A1 | 12/2006 | Nomura et al. | |
| 2007/0019938 | A1 | 1/2007 | Nomura | |
| 2007/0171554 | A1 * | 7/2007 | Yoshii et al. | .................. 359/819 |

FOREIGN PATENT DOCUMENTS

JP 2004-206115 7/2004

* cited by examiner

*Primary Examiner* — Jessica T Stultz
(74) *Attorney, Agent, or Firm* — Greenblum & Bernstein, P.L.C.

(57) ABSTRACT

A support structure for a light quantity control unit of a lens barrel includes a holding frame which holds a light quantity control member; front and rear support members positioned in front and behind the holding frame, respectively; a front guide pin and a front pin support hole formed on one and the other of the holding frame and the front support member, the front guide pin being slidably inserted into the front pin support hole; and a rear guide pin and a rear pin support hole formed on one and the other of the holding frame and the rear support member, the rear guide pin being slidably inserted into the rear pin support hole. The holding frame is supported by the front and rear guide pins and the front and rear pin support holes to be movable between the front and rear support members.

20 Claims, 8 Drawing Sheets

SUPPORT STRUCTURE FOR LIGHT QUANTITY CONTROL UNIT OF LENS BARREL

BACKGROUND OF THE INVENTION

1. Field of the Invention

The present invention relates to a support structure for a light quantity control unit of a lens barrel.

2. Description of the Related Art

In a lens shutter type of lens barrel, a light quantity control unit such as a shutter or a diaphragm is often supported via a lens group holding frame. Although light quantity control members such as shutter blades or diaphragm blades must be located at predetermined positions due to optical design when pictures are taken, such elements of the light quantity control unit are free from optically-imposed constraints in the lens barrel accommodated state (in which no pictures are taken), and accordingly, a reduction in length of the lens barrel can be achieved by, e.g., bringing the light quantity control unit closer to an adjacent lens group in an optical axis direction. A support structure for a shutter unit which supports the shutter unit in a manner to allow the shutter unit to move in an optical axis direction is disclosed in, e.g., Japanese Unexamined Patent Publication 2004-206115 (hereinafter referred to as Patent Document 1).

In Patent Document 1, a shutter unit is supported to be movable in an optical axis direction by a long shaft (guide shaft) elongated in the optical axis direction. In the case where such a long shaft is molded integrally with a lens holding frame into a resin-made molded component, it is conceivable that the mold used for this molding will be parted from the molded component in the axial direction of the shaft to prevent molding lines from being formed on the molded component. However, the shaft needs to be provided with a tapered surface for releasing the shaft from the mold if the shaft is long. If the outer surface of the shaft is tapered, this tapered outer surface becomes a cause of rattling or tilting, thus making it difficult to guide the shutter unit with a high degree of precision. If a metal shaft provided as a separate member from the lens holding frame is used, the precision of the guiding can be easily secured; however, the production cost increases.

SUMMARY OF THE INVENTION

The present invention provides a support structure for a light quantity control unit of a lens barrel, wherein the light quantity control unit is movable in an optical axis direction, wherein the support structure is structured to be capable of supporting the light quantity control unit with a high degree of precision, and wherein the support structure is simple in structure and can be obtained at low cost.

According to an aspect of the present invention, a support structure for a light quantity control unit of a lens barrel is provided, including a holding frame which holds a light quantity control member; a front support member and a rear support member positioned in front of and behind the holding frame, respectively, a distance between the front support member and the rear support member in an optical axis direction being fixed; a front guide pin and a front pin support hole which are formed on one and the other of the holding frame and the front support member, the front guide pin extending in the optical axis direction and being slidably inserted into the front pin support hole; and a rear guide pin and a rear pin support hole which are formed on one and the other of the holding frame and the rear support member, the rear guide pin extending in the optical axis direction and being slidably inserted into the rear pin support hole. The holding frame is supported by the front guide pin, the front pin support hole, the rear guide pin and the rear pin support hole to be movable in the optical axis direction between the front support member and the rear support member.

It is desirable for the front support member to include a forward movement limit portion which limits forward movement of the holding frame, for the rear support member to include a rearward movement limit portion which limits rearward movement of the holding frame, for the front guide pin and the rear guide pin to project from the forward movement limit portion and the rearward movement limit portion, respectively, and for the front pin support hole and the rear pin support hole to be formed in the holding frame.

It is desirable for the front guide pin and the rear guide pin to be coaxial with each other.

It is desirable for the holding frame to include a through-hole which extends through the holding frame in the optical axis direction, the front pin support hole and the rear pin support hole being formed as part of the through-hole.

It is desirable for the front support member to hold a lens group. The holding frame is located at a position whereby the light quantity control member is positioned away from the lens group in the optical axis direction when the lens barrel is in an operating state in which a photographing operation is possible, and the holding frame is moved to a position whereby the light quantity control member lies in a plane orthogonal to the optical axis in which at least part of the lens group lies when the lens barrel moves from the operating state to a lens barrel accommodated state in which a photographing operation is not possible.

It is desirable for the support structure to include a biasing device which biases the holding frame toward the rear support member. When the lens barrel moves from the operating state to the lens barrel accommodated state, the front support member and the rear support member move rearward in the optical axis direction, and the holding frame comes into contact with a rear member provided behind the rear support member so that the holding frame is prevented from further moving rearward so as to be closely approached by the front support member against a biasing force of the biasing device during the course of the rearward movement of the front support member and the rear support member.

It is desirable for the support structure to include a biasing device which biases the holding frame toward one of the front support member and the rear support member. When the lens barrel moves from an operating state in which a photographing operation is possible to a lens barrel accommodated state in which a photographing operation is not possible, the holding frame moves in a direction opposite to a biasing direction of the biasing device against a biasing force of the biasing device.

It is desirable for the lens barrel is a retractable zoom lens barrel.

It is desirable for opposite end openings of the through-hole to be formed as divergent openings, diameters of which increase in directions away from each other in the optical axis direction, respectively.

It is desirable for the front support member and the rear support member to be formed as separate members which are fixed to each other by a set screw.

In an embodiment, a supporting structure is provided for supporting a holding frame of a lens barrel in a manner to allow the holding frame to move in an optical axis direction relative to a lens group holding member, the holding frame holding a light quantity control member, the supporting structure including a movement limit member which is fixed to the lens group holding member and limits movement of the holding frame in a direction away from the lens group holding member in the optical axis direction; a first guide pin provided on one of the holding frame and the lens group holding member, the first guide pin being slidably inserted into a first pin support hole provided in the other of the holding frame and the lens group holding member; and a second guide pin provided on one of the holding frame and the movement limit member, the second guide pin being slidably inserted into a second pin support hole provided in the other of the holding frame and the movement limit member. The holding frame is supported by the lens group holding member via the first guide pin and the first pin support hole and the holding frame is supported by the movement limit member via the second guide pin and the second pin support hole into which the second guide pin is slidably inserted, so that the holding frame is movable in the optical axis direction relative to the lens group holding member and the movement limit member.

In an embodiment, a supporting structure is provided for supporting a holding frame which holds a light quantity control member of a lens barrel in a manner to allow the holding frame to move in an optical axis direction relative to a lens group holding member. The supporting structure comprises a movement limit member which is fixed to the lens group holding member and limits movement of the holding frame in a direction away from the lens group holding member in the optical axis direction. The holding frame is supported by each of the lens group holding member and the movement limit member to be movable in the optical axis direction via a combination of a guide pin and a pin support hole into which the guide pin is slidably inserted, respectively.

According to the present invention, a shaft having a long axial length does not have to be used because the light control member holding frame is guided in the optical axis direction by two guide pins positioned as front and rear guide pins which are arranged separately from each other. In addition, the production cost can be reduced because these two guide pins can be molded integrally with a front support member (or the light quantity control member holding frame) and a rear support member (or the light quantity control member holding frame), respectively.

The present disclosure relates to subject matter contained in Japanese Patent Applications No. 2007-291656 (filed on Nov. 9, 2007) and No. 2008-168323 (filed on Jun. 27, 2008) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENT

The brief description of the structure of a zoom lens barrel 70 including a light quantity control unit support structure according to the present invention will be hereinafter discussed with reference to FIGS. 1 through 4. A photographing optical system of the zoom lens barrel 70 is provided with a first lens group LG1, a second lens group LG2, a set of shutter blades S (light quantity control members) that also serves as a set of diaphragm blades, a third lens group (AF lens group) LG3, a low-pass filter (optical filter) 25 and an image pickup device (image sensor) 71, in that order from the object side. In the following descriptions, the optical axis direction refers to a direction along or parallel to the photographing optical axis O of this photographing optical system.

The low-pass filter 25 and the image pickup device 71 are integrated as a single unit and this unit is fixed to an image pickup device holder (rear member) 23, and the image pickup device holder 23 is fixed to the back of a housing 22 of the zoom lens barrel 70. A zoom motor 150 and an AF motor 160 are supported by the housing 22 on the outside thereof.

A third lens group frame 51 which supports the third lens group LG3 is supported by the housing 22 to be movable in the optical axis direction relative to the housing 22. The third lens group frame 51 is driven by the AF motor 160.

The cam ring 11 is positioned inside the housing 22 and supported by the housing 22. The cam ring 11 is rotated by the driving force of a zoom motor 150. The cam ring 11 moves in the optical axis direction while rotating about the photographing optical axis O until reaching a ready-to-photograph state (the wide-angle extremity shown in the upper half of FIG. 4) from the lens barrel accommodated state (shown in FIG. 3), and the cam ring 11 rotates at a fixed position in the optical axis direction when the zoom lens barrel 70 is in the zooming range (between the wide-angle extremity shown in an upper half of FIG. 4 and the telephoto extremity shown in a lower half of FIG. 4) in a ready-to-photograph state.

The zoom lens barrel 70 is provided with a first advancing barrel 13 and a linear guide ring 10 which are supported by the housing 22 with the cam ring 11 being positioned between the first advancing barrel 13 and the linear guide ring 10. Each of the first advancing barrel 13 and the linear guide ring 10 is guided linearly in the optical axis direction relative to the housing 22. In addition, each of the first advancing barrel 13 and the linear guide ring 10 is coupled to the cam ring 11 to be rotatable relative to the cam ring 11 and to move with the cam ring 11 in the optical axis direction.

The linear guide ring 10 guides a second lens group frame (front support member) 8 linearly in the optical axis direction so that the second lens group moving frame 8 can move linearly in the optical axis direction relative to the linear guide ring 10. The zoom lens barrel 70 is provided inside the second lens group moving frame 8 with a second lens holding frame 2 and a shutter unit 100 which are supported by the second lens group moving frame 8. The second lens holding frame 2 holds the second lens group LG2 and the shutter unit 100 supports the shutter blades S. In addition, the first advancing barrel 13, which is guided linearly in the optical axis direction relative to the housing 22, further guides a second advancing barrel 12 linearly in the optical axis direction so that the second advancing barrel 12 can move linearly in the optical axis direction relative to the first advancing barrel 13. The zoom lens barrel 70 is provided inside the second advancing barrel 12 with a first lens group holding frame 1 which holds the first lens group LG1.

The second advancing barrel 12 is provided with first cam followers CF1 for moving the first lens group LG1 each of which projects radially inwards. Each first cam follower CF1 slidably engages in an associated first-lens-group control cam groove CG1 formed on an outer peripheral surface of the cam ring 11. Since the second advancing barrel 12 is guided linearly in the optical axis direction via the first advancing barrel 13, a rotation of the cam ring 11 causes the second advancing barrel 12 (i.e., the first lens group LG1) to move in the optical axis direction in a predetermined moving manner in accordance with the contours of the first-lens-group control cam grooves CG1.

The second lens group moving frame 8 is provided on an otter peripheral surface thereof with second cam followers CF2, each of which projects radially outwards, for moving the second lens group LG2. Each second cam follower CF2 slidably engages in an associated second-lens-group control cam groove CG2 formed on an inner peripheral surface of the cam ring 11. Since the second lens group moving frame 8 is guided linearly in the optical axis direction via the linear guide ring 10, a rotation of the cam ring 11 causes the second lens group moving frame 8 (i.e., the second lens group LG2) to move in the optical axis direction in a predetermined moving manner in accordance with the contours of the second-lens-group control cam grooves CG2.

The zoom lens barrel 70 is provided between the second lens group moving frame 8 and the second advancing barrel 12 with an inter-lens-group biasing spring 27 made of a compression spring which biases the second lens group moving frame 8 and the second advancing barrel 12 in opposite directions away from each other.

Operations of the zoom lens barrel 70 that has the above described structure will be discussed hereinafter. In the lens barrel accommodated state shown in FIGS. 1 and 3, the length of the optical system in the optical axis direction (the distance from the front surface (object-side surface) of the first lens group LG1 to the imaging surface of the image pickup device 71) is shorter than that in a ready-to-photograph state shown in FIGS. 2 and 4. In the lens barrel accommodated state, upon a state transitional signal for transition from the lens barrel accommodated state to a ready-to-photograph state is turned ON (e.g., turning ON a main switch of the camera to which the zoom lens barrel 1 is mounted), the zoom motor 150 is driven in the lens barrel advancing direction, which causes the cam ring 11 to advance in the optical axis direction while rotating. The linear guide ring 10 and the first advancing barrel 13 linearly move with the cam ring 11. Upon the cam ring 11 being rotated, the second lens group moving frame 8, which is guided linearly in the optical axis direction via the linear guide ring 10, is moved in the optical axis direction in a predetermined moving manner inside the cam ring 11 due to the engagement of the second cam followers CF2 with the second-lens-group control cam grooves CG2. Additionally, upon the cam ring 11 being rotated, the second advancing barrel 12, which is guided linearly in the optical axis direction via the first advancing barrel 13, is moved in the optical axis direction in a predetermined moving manner outside the cam ring 11 due to the engagement of the first cam followers CF1 with the first-lens-group control cam grooves CG1.

Namely, the amount of advancement of the first lens group LG1 from the lens barrel accommodated state is determined by the sum of the amount of forward movement of the cam ring 11 relative to the housing 22 and the amount of advancement of the second advancing barrel 12 relative to the cam ring 11, and the amount of advancement of the second lens group LG2 from the lens barrel accommodated state is determined by the sum of the amount of forward movement of the cam ring 11 relative to the housing 22 and the amount of advancement of the second lens group moving frame 8 relative to the cam ring 11. A zooming operation is carried out by moving the first lens group LG1 and the second lens group LG2 along the photographing optical axis O while changing the air distance therebetween. By driving the zoom motor 150 in a barrel-advancing direction so as to advance the zoom lens barrel 70 from the lens barrel accommodated state firstly causes the zoom lens barrel 70 to move to the wide-angle extremity shown in the upper half of the cross sectional view in FIG. 4, and further driving the zoom motor 150 in the same direction causes the zoom lens barrel 70 to move to the telephoto extremity shown in the lower half of the cross sectional view in FIG. 4. In the zooming range that ranges between the telephoto-extremity and the wide-angle extremity, the cam ring 11 rotates at a fixed position as described above, thus not moving either forward or rearward in the optical axis direction. Immediately after a transition signal for transition from a ready-to-photograph state to the lens barrel accommodated state is input to the zoom lens barrel 70 (e.g., turning OFF the aforementioned main switch of the camera to which the zoom lens barrel 70 is mounted), the zoom motor 150 is driven in the lens barrel retracting direction, which causes the zoom lens barrel 70 to perform a lens barrel retracting operation reverse to the above described lens barrel advancing operation.

The zoom lens barrel 70 is provided at the front end of the second advancing barrel 12 with a set of protective barrier blades 104 which opens and shuts the front of the first lens group LG1. The set of protective barrier blades 104 is closed in the lens barrel accommodated state, and opened in accordance with the lens barrel advancing operation.

The third lens group frame 51 that supports the third leas group LG3 can be moved forward and rearward in the optical axis direction by the AF motor 160 independently of the above described driving operations of the first lens group LG1 and the second lens group LG2 that are performed by the zoom motor 160. In addition, when the photographing optical system of the zoom lens barrel 70 is in the zooming range that ranges from the wide-angle extremity to the telephoto extremity, the third lens group LG3 is moved in the optical axis direction to perform a focusing operation by driving the AF motor 160 in accordance with object distance information obtained by a distance measuring device (not shown) provided, e.g., in the camera to which the zoom lens barrel 70 is mounted.

Figure 1:
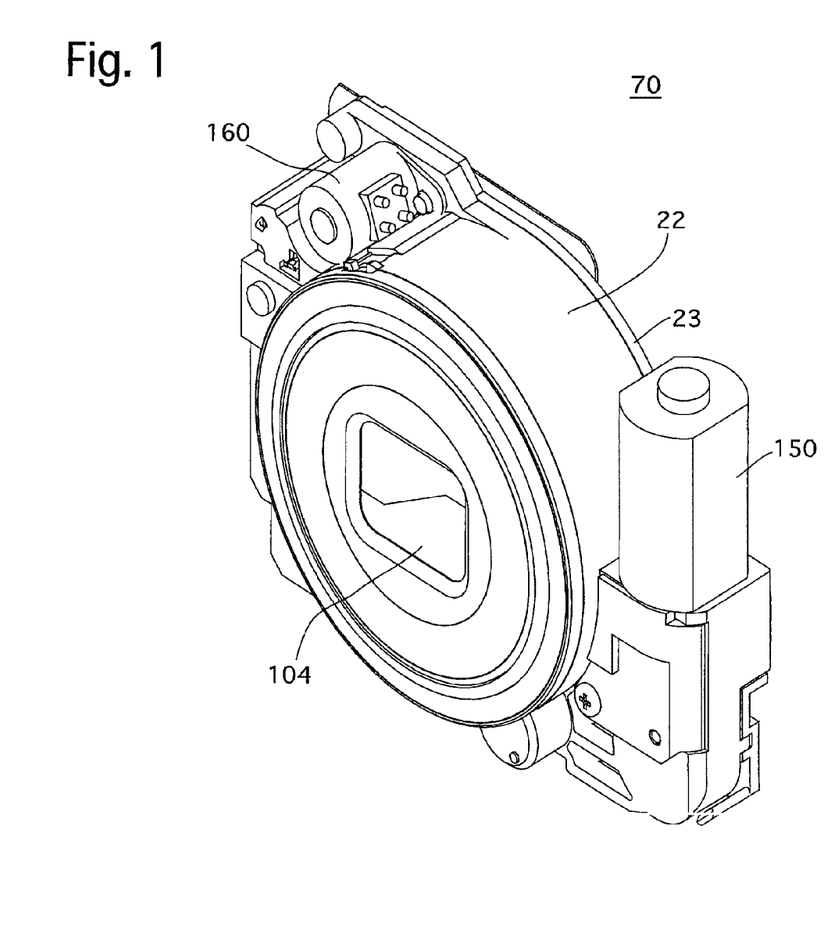
FIG. 1 is an external perspective view of a zoom lens barrel according to the present invention when the zoom lens barrel is in an accommodated state (fully retracted state)
Figure 2:
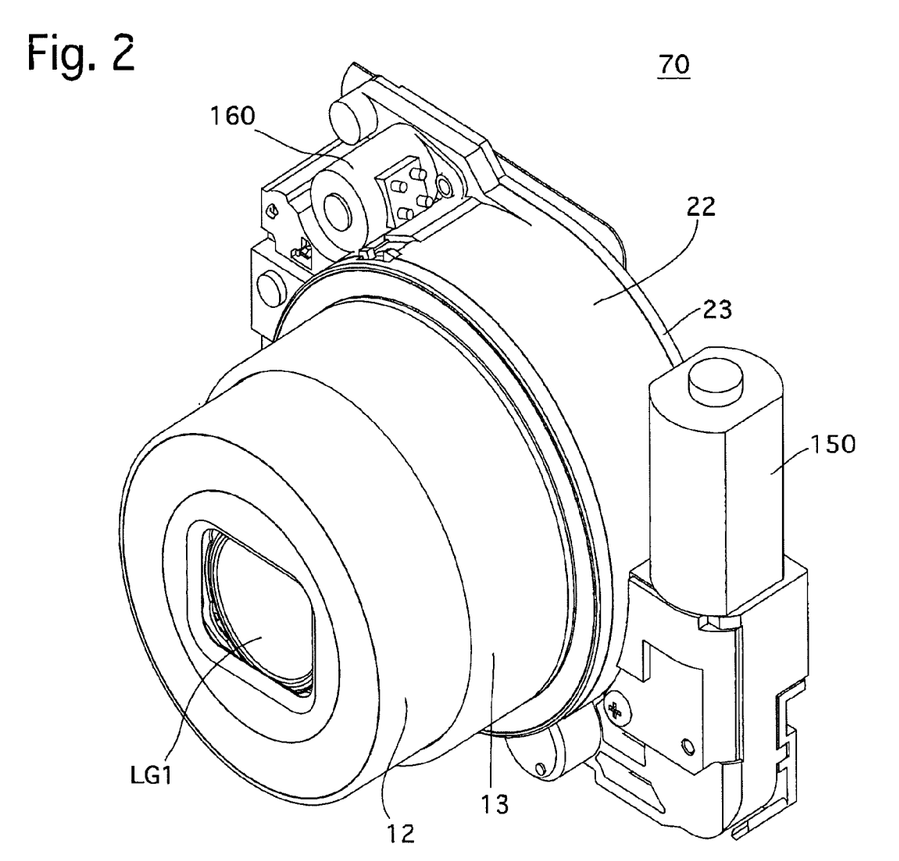
FIG. 2 is an external perspective view of the zoom lens barrel when the zoom lens barrel is in a ready-to-photograph state.
Figure 3:
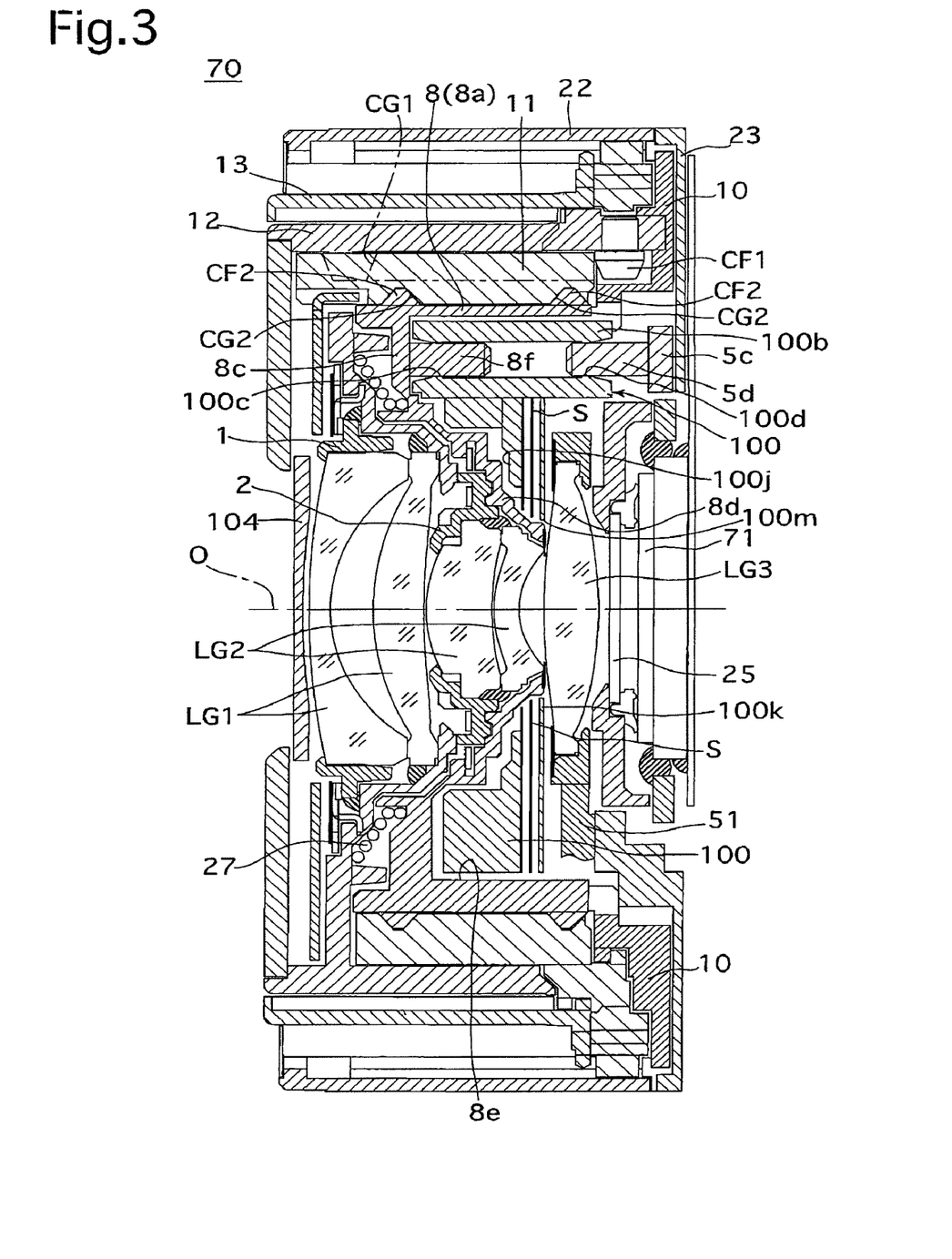
FIG. 3 is a cross sectional view of the zoom lens barrel when the zoom lens barrel is in the accommodated state.
Figure 4:
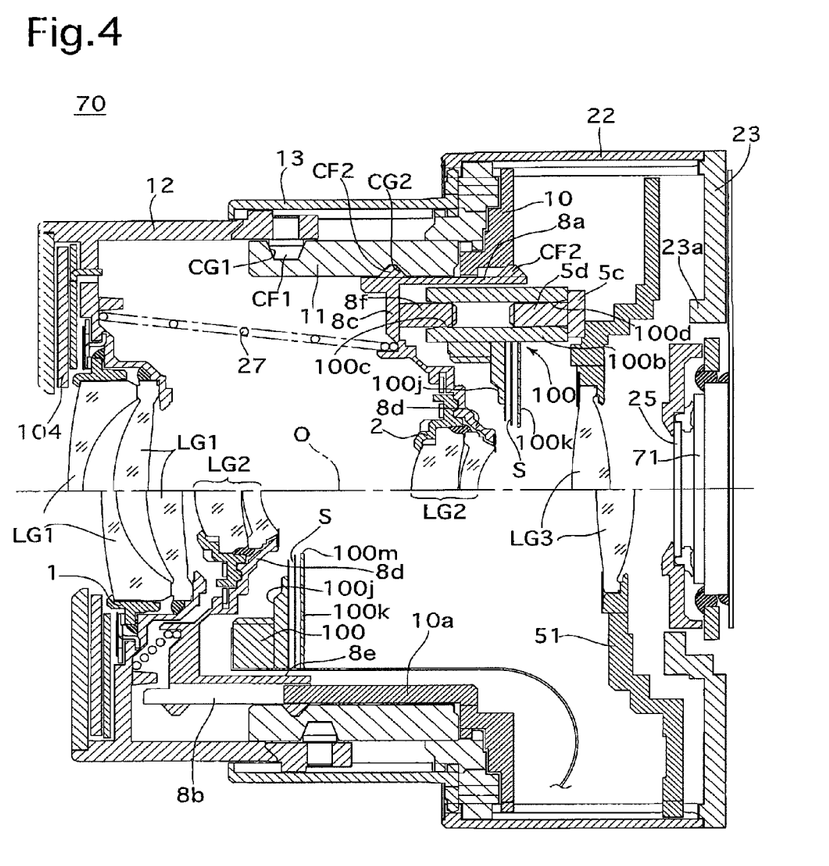
FIG. 4 is a cross sectional view of the zoom lens barrel when the zoom lens barrel is in a ready-to-photograph state, wherein an upper half and a lower half of the zoom lens barrel shown in FIG. 4 show the zoom lens barrel set at the wide-angle extremity and the telephoto extremity, respectively.
Figure 5:
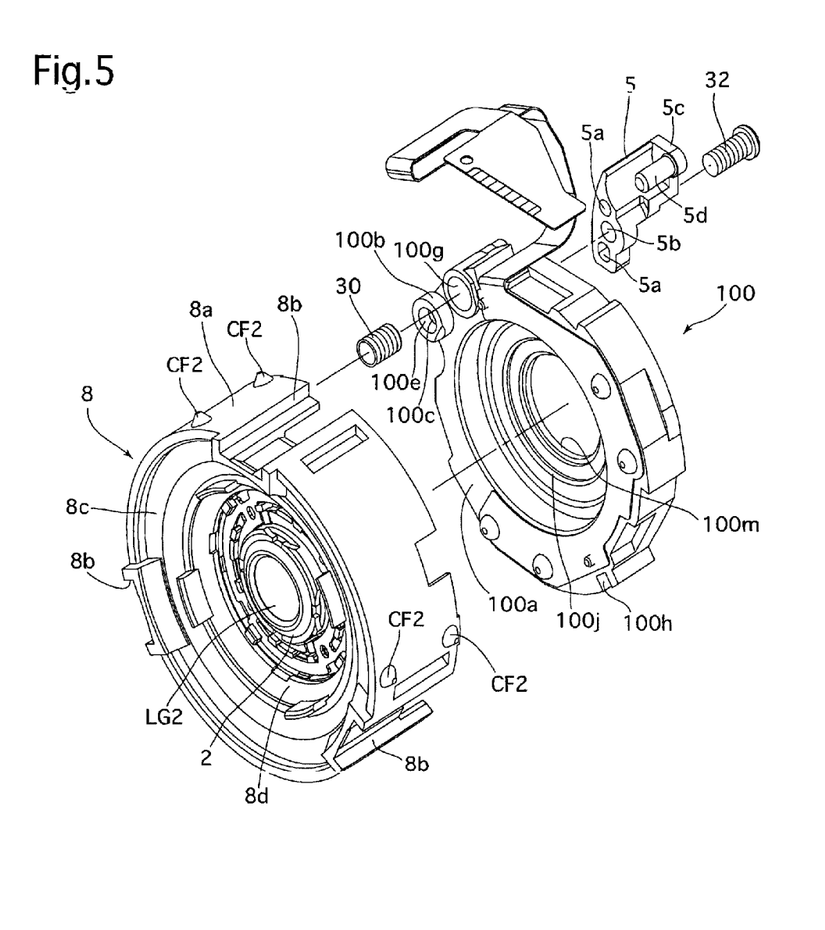
FIG. 5 is a front exploded perspective view of a second lens group moving frame, a shutter unit and associated elements, showing a shutter unit support structure for supporting the shutter unit via the second lens group moving frame.
Figure 6:
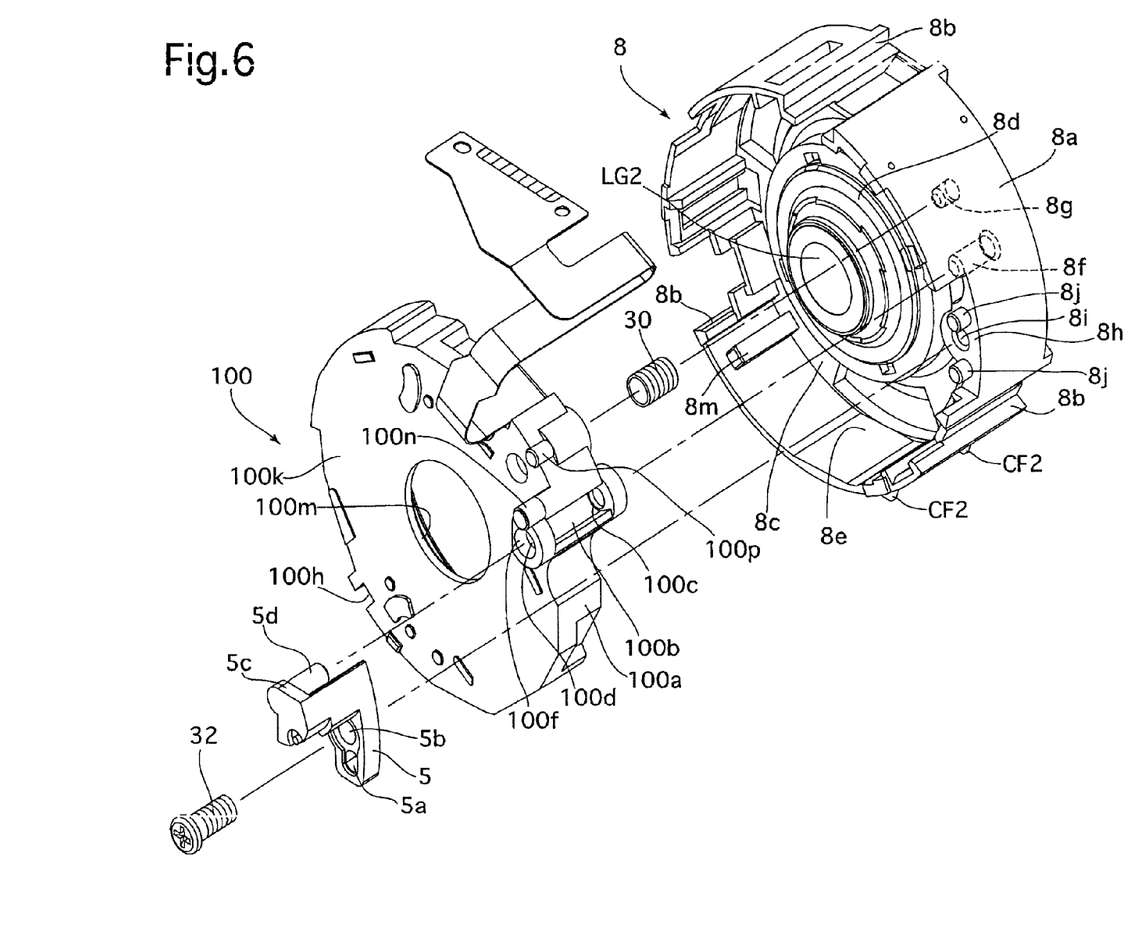
FIG. 6 is a rear exploded perspective view of the second lens group moving frame, the shutter unit and the associated elements shown in FIG. 5, showing the shutter unit support structure shown in FIG. 5.
Figure 7:
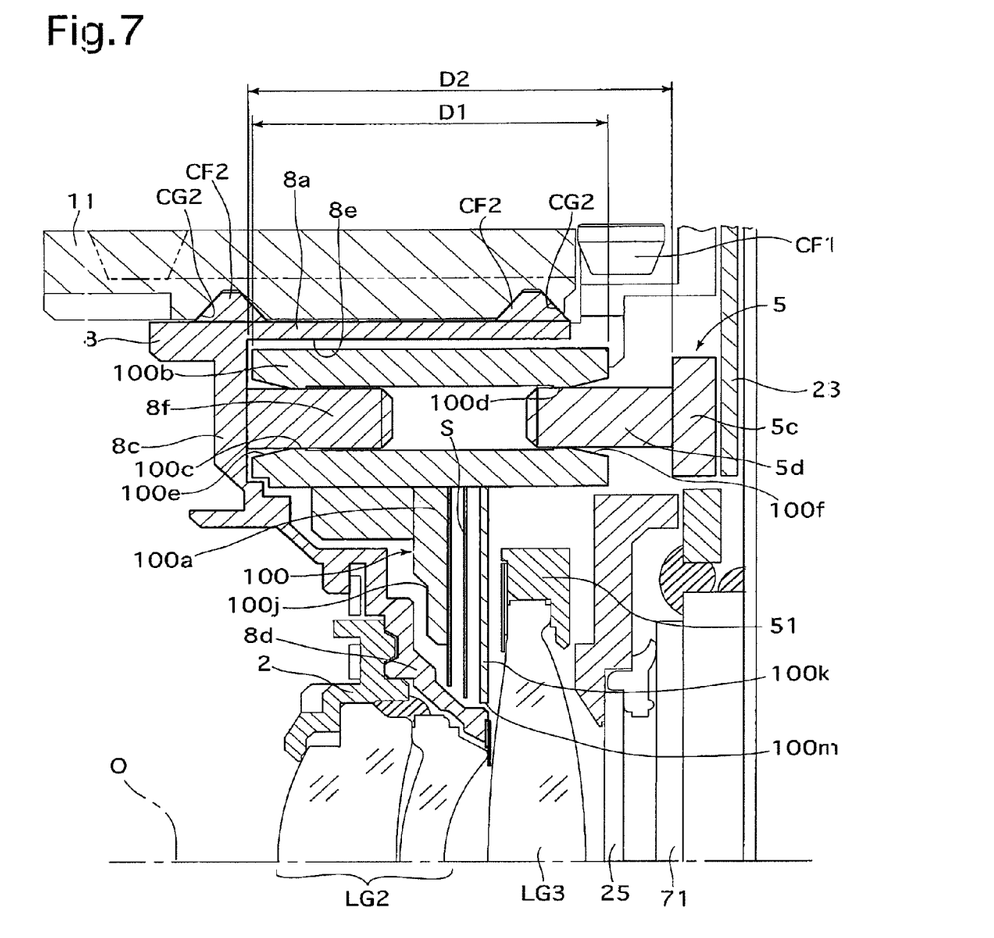
FIG. 7 is a magnified cross-sectional view of a portion of the zoom lens barrel in the vicinity of the shutter unit when the zoom lens barrel is in the accommodated state.
Figure 8:
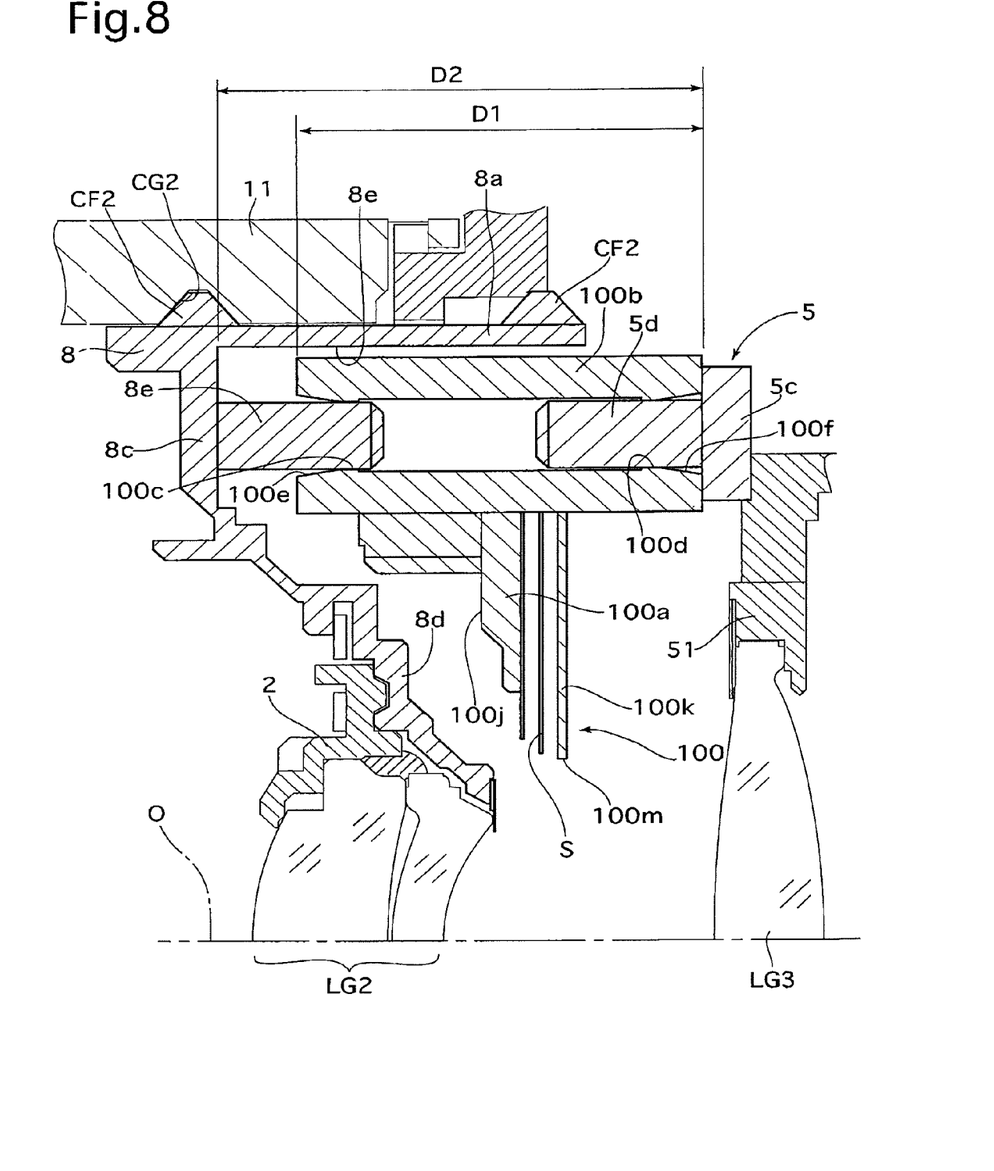
FIG. 8 is a magnified cross-sectional view of a portion of the zoom lens barrel in the vicinity of the shutter unit when the zoom lens barrel is in a ready-to-photograph state (at the wide-angle extremity).

The light quantity control unit support structure that is configured to support the shutter unit (light amount control unit) 100 will be hereinafter discussed with reference mainly to FIG. 5 onwards. The second lens group moving frame 8 is provided with a cylindrical portion 8*a* having second cam followers CF2 which are formed on an outer peripheral surface of the cylindrical portion 8*a*. The second lens group moving frame 8 is guided linearly in the optical axis direction via the engagement between three guide slots 8b which are formed through the cylindrical portion 8a to be elongated in the optical axis direction and three linear guide keys 10a (see FIG. 4) formed on the linear guide ring 10. As shown in FIGS. 7 and 8, the second lens group moving frame 8 is provided, on an inner peripheral surface of the cylindrical portion 8a in the vicinity of the front end thereof, with a ring-shaped front flange (forward movement limit portion) 8c which lies in a plane substantially orthogonal to the photographing optical axis O. The second lens group moving frame 8 is provided radially inside the cylindrical portion 8a with a second lens group holding ring portion 8d which tapers step wisely toward the rear in the optical axis direction. The second lens group LG2 is held between the second lens group holding ring portion 8d and the second lens group holding frame 2. The second lens group moving frame 8 is provided behind the front flange 8c and the second lens group holding ring portion 8d with a shutter unit accommodation space 8e. As shown in FIG. 6, the second lens group moving frame 8 is provided, on a rear surface of the front flange 8c which is exposed to the shutter unit accommodation space 8e, with a front guide pin 8f and a spring support pin 8g which project rearward in the optical axis direction. A shutter unit biasing spring 30 made of a compression coil spring is fitted on the spring support pin 8g to be supported thereby. The second lens group moving frame 8 is provided, on the cylindrical portion 8a in the vicinity of the front guide pin 8f, with a stopper mounting recess 8h that is formed by cutting out part of the cylindrical portion 8a. The second lens group moving frame 8 is provided in the stopper mounting recess 8h with a screw hole 8i and a pair of positioning projections 8j positioned on opposite sides of the screw hole 8i. The entire part of the second lens group moving frame 8, which includes the front guide pin 8f, the spring support pin 8g, and the positioning projection 8j, is a molded component integrally molded of synthetic resin.

A shutter stopper member (rear support member/movement limit member) 5 is mounted to the stopper mounting recess 8h. The shutter stopper member 5 is provided with a pair of positioning holes 5a which are engaged with the pair of positioning projections 8j, and a screw insertion hole 5b which is communicatively connected with the screw hole 8i of the second lens group moving frame 8. The shutter stopper member 5 is fixed to the second lens group moving frame 8 by screwing a set screw 32 into the screw hole 8i through the screw insertion hole 5b. The shutter stopper member 5 is provided with a rearward movement limit portion 5c which is offset behind the mounting portion of the shutter stopper member 5, that is mounted to the stopper mounting recess 8h, so as to face the front flange 8c. The shutter stopper member 5 is provided with a rear guide pin 5d which projects from the rearward movement limit portion 5c toward the front in the optical axis direction. The entire part of the shutter stopper member 5, which includes the rearward movement limit portion 5c and the rear guide pin 5d, is a molded component integrally molded of synthetic resin.

The front guide pin 8f and the rear guide pin 5d are cylindrical-columnar projections, the diameters of which are substantially identical to each other. The front guide pin 8f and the rear guide pin 5d are coaxial with each other, i.e., aligned with each other in a state where the shutter stopper member 5 is fixed to the second lens group moving frame 8. In this state, the common axis of the front guide pin 8f and the rear guide pin 5d is substantially parallel to the photographing optical axis O. In addition, as shown in FIGS. 7 and 8, the ends of the front guide pin 8f and the rear guide pin 5d which face each other in the axial direction thereof aide coaxial with each other and are spaced-apart from each other in the optical axis direction.

The shutter unit 100 is provided with a shutter holding frame (light quantity control member holding frame) 100a which supports the set of shutter blades S therein. The shutter unit 100 is provided with a through-sleeve 100b having a through-hole extending in the optical axis direction, and is provided, in the vicinity of an outer periphery of the shutter holding frame 100a at the front and rear ends of the through-sleeve 100b, with a front pin support hole 100c and a rear pin support hole 100d, respectively. The front pin support hole 100c and the rear pin support hole 100d are cylindrical through-holes, the axes of which are parallel to the photographing optical axis O and coaxial with each other. The front pin support hole 100c has an inner diameter allowing the front guide pin 8f to be slidably inserted into the front pin support hole 100c in the axial direction thereof with no play, while the rear pin support hole 100d has an inner diameter allowing the rear guide pin 5d to be slidably inserted into the rear pin support hole 100d in the axial direction thereof with no play. The through-sleeve 100b is formed in a partial cylinder, the outer periphery of which is partly missing; however, the inner diameter of the partially cylindrical portion in the middle part of the through-sleeve 100b is greater than the inner diameters of the front pin support hole 100c and the rear pin support hole 100d. The front pin support hole 100c is provided at the front thereof with a tapered opening portion (divergent opening portion) 100e, the inner surface of which tapers toward the rear in the optical axis direction, while the rear pin support hole 100d is provided at the rear thereof with a tapered opening portion (divergent opening portion) 100f the inner surface of which tapers toward the front in the optical axis direction. The shutter holding frame 100a is provided, on the front thereof in the vicinity of the through-sleeve 100b, with a spring support hole 100g (see FIG. 5) into which the shutter unit biasing spring 30 can be inserted. In addition, the shutter holding frame 100a is provided on an outer peripheral surface thereof with an anti-rotation-key receptive portion 100h, and the second lens group moving frame 8 is provided on an inner peripheral surface thereof in the shutter unit accommodation space 8e with an anti-rotation key 8m which is engaged in the anti-rotation-key receptive portion 100h to be slidable on the anti-rotation-key receptive portion 100h in the optical axis direction and to be prevented from rotating relative to the anti-rotation-key receptive portion 100h. The shutter holding frame 100a is provided on the front thereof with a front recessed portion 100j which is shaped to correspond to the second lens group holding ring portion 8d. In addition, the shutter holding frame 100a is provided on the rear thereof with a rear cover plate 100k which is fixed so as to cover the rear end of the shutter holding frame 100a behind the set of shutter blades S. The rear cover plate 100k is provided at a center thereof with a circular shutter opening 100m which is opened and shut by the set of shutter blades S.

The shutter unit 100 is mounted to the second lens group moving frame 8 in a manner which will be discussed hereinafter. Firstly, the shutter unit 100 is inserted in the shutter unit accommodation space 8e with the shutter unit biasing spring 30 being supported by the spring support pin 8g. Inserting the shutter unit 100 into the shutter unit accommodation space 8e in a direction to approach the front flange (i.e., in the forward direction) from the rear end side of the second lens group moving frame 8 with the anti-rotation key 8m being aligned with the anti-rotation-key receptive portion 100h causes the front guide pin 8f to be inserted into the front pin support hole 100c and simultaneously causes the shutter unit biasing spring 30 to be inserted into the spring support hole 100g. At this time, due to the presence of the tapered opening portion 100e that is formed at the front of the front pin support hole 100c, the front guide pin 8f can be easily inserted into the front pin support hole 100c.

Subsequently, the shutter stopper member 5 is installed in the stopper mounting recess 8h. Since the rear guide pin 5d is positioned coaxially with the front guide pin 8f with the position of the shutter stopper member 5 being determined by the engagement of the pair of positioning projections 8j with the pair of positioning holes 5a, the rear guide pin 5d is inserted into the rear pin support hole 100d of the shutter unit 100 according to installation of the shutter stopper member 5 to the stopper mounting recess 8h. At this installation, due to the presence of the tapered opening portion 100f that is formed at the rear of the rear pin support hole 100d, the rear guide pin 5d can be easily inserted into the rear pin support hole 100d. Thereafter, by fixing the shutter stopper member 5 to the second lens group moving frame 8 by the set screw 32, the shutter unit 100 is positioned between the front flange 8c of the second lens group moving frame 8 and the rearward movement limit portion 5c of the shutter stopper member 5 and held in the shutter unit accommodation space 8e.

In a state where the shutter unit 100 is mounted to the second lens group moving frame 8, the shutter unit 100 is supported by the second lens group moving frame 8 to be movable in the optical axis direction relative to the second lens group moving frame 8 and the shutter stopper member 5 by the slidable engagement of the front pin support hole 100c with the front guide pin 8f and the slidable engagement of the rear pin support hole 100d with the rear guide pin 5d. By the engagement of the anti-rotation key 8m with the anti-rotation-key receptive portion 100h, the shutter unit 100 is prevented from rotating relative to the second lens group moving frame 8, and the shutter unit 100 is guided so as to be capable of moving only linearly in the optical axis direction. As shown in FIGS. 7 and 8, a length D1 of the through-sleeve 100b in the shutter unit 100 in the optical axis direction is smaller than a spacing (length) D2 between the front flange 8c and the rearward movement limit portion 5c in the optical axis direction, and the shutter unit 100 is movable in the moving range between the limit of forward movement determined by the front flange 8c and the limit of rearward movement determined by the rearward movement limit portion 5c. Although the rear end of the front guide pin 8f and the front end of the rear guide pin 5d are spaced apart from each other in the optical axis direction, the axial lengths of the guide pins 8f and 5d and the formation positions of the pin support holes 100c and 100d are determined so that the front guide pin 8f and the rear guide pin 5d do not come out of the front pin support hole 100c and the rear pin support hole 100d, respectively, within the range of movement of the shutter unit 100 between the front and rear moving limits thereof (which corresponds to "D2-D1"). In a state where the shutter unit 100 is mounted to the second lens group moving frame 8, the shutter unit biasing spring 30 is compressed, and the shutter unit 100 is continuously biased by the resiliency of the shutter unit biasing spring 30 toward the rear moving limit thereof at which the through-sleeve 100b abuts against the rearward movement limit portion 5c.

In the ready-to-photograph state shown in FIG. 8, the shutter unit 100 is held at the rear moving limit that is located inside the shutter unit accommodation space 8e by the biasing force of the shutter unit biasing spring 30, and the set of shutter blades S is positioned behind the second lens group LG2. When the zoom lens barrel 70 moves from a ready-to-photograph state to the lens barrel accommodated state, the second lens group moving frame 8 is moved rearward in the optical axis direction via the cam ring 11 by the driving force of the zoom motor 150, and the shutter unit 100 that is held inside the shutter unit accommodation space 8e also moves rearward in a similar manner. Upon the second lens group moving frame 8 having been moved rearward to some extent, a first rear projection 100n (see FIG. 6) formed on the shutter unit 100 abuts against a front projection 23a (see FIG. 4) formed on a front surface of the image pickup device holder 23 to thereby be prevented from further moving rearward. On the other hand, the second lens group moving frame 8 continues to move rearward, and consequently, the shutter unit 100, which is supported to be movable in the optical axis direction via the engagement of the front guide pin 8f with the front pin support hole 100c and the engagement of the rear guide pin 5d with the rear pin support hole 100d, is moved forward relative to the second lens group moving frame 8 in the shutter unit accommodation space 8e in a direction away from the rearward movement limit portion 5d to approach the front flange 8c. When the zoom lens barrel 70 reaches the lens barrel accommodated state, the shutter unit 100 is moved to a position in the vicinity of the front moving limit in the shutter unit accommodation space 8e, the front end of the through-sleeve 100b is positioned close to the front flange 8c, and the second lens group holding ring portion 8d enters the front recessed portion 100j as shown in FIG. 7. In addition, part of the second lens group holding ring portion 8d in the vicinity of the rear end thereof enters the shutter opening 100m, and the set of shutter blades S is positioned to lie in a plane orthogonal to the photographing optical axis O in which the second lens group LG2 partly lies. At this time, the set of shutter blades S is open and retracts radially outwards from the shutter opening 100m, thus not interfering with the second lens group LG2. Additionally, the third lens group frame 51 that holds the third lens group frame LG3 is positioned between the shutter unit 100 and the image pickup device holder 23. When the zoom lens barrel 70 is driven to be accommodated, a second rear projection 100p (see FIG. 6) formed on the shutter unit 100 abuts against the third lens group frame 51 and moves the third lens group frame 51 back to the rear moving limit thereof shown in FIG. 7 in the optical axis direction. Thereafter, upon the second lens group frame 8 and the third lens group frame 51 reaching their respective rear moving limits, the third lens group LG3 enters the shutter unit accommodation space 8e as shown in FIG. 7, which reduces the distance between the second lens group LG2 and the third lens group LG3 in the optical axis direction.

In this manner, when the zoom lens barrel 70 moves from a ready-to-photograph state to the lens barrel accommodated state, the accommodation space occupied in the optical axis direction by the optical elements ranging from the second lens group LG2 to the third lens group LG3 via the set of shutter blades S that is positioned therebetween can be shortened by changing the relative position of the shutter unit 100 with respect to the second lens group frame 8 in the optical axis direction within the shutter unit accommodation space 8e against the biasing force of the shutter unit biasing spring 30, which makes it possible to achieve a reduction in length of the zoom lens barrel 70. In addition, the guide device for guiding movements of the shutter unit 100 in the optical axis direction is arranged as a plurality of separate members, i.e., the front guide pin 8f and the rear guide pin 5d that are provided on the second lens group moving frame 8 and the shutter stopper member 5, respectively, and the shutter holding frame 100a is supported from both sides thereof by the front guide pin 8f and the rear guide pin 5d. Due to this structure, each guide pin 8f and 5d is shorter than the length of the through-sleeve 100b of the shutter unit 100 in the optical axis direction. Accordingly, a tapered surface for releasing the mold which would be required to be formed on a guide shaft in the case where the guide shaft having a long length in the optical axis direction is molded is no longer necessary, which makes it possible to guide the shutter unit 100 with a high degree of precision. Since the state where the front guide pin 8f and the rear guide pin 5d are supported by the front pin support hole 100c and the rear pin support hole 100d, respectively, is maintained over the entire range of movement of the shutter unit 100 in the shutter unit accommodation space 8e, there is no possibility of the shutter unit 100 leaning or tilting even though the axially-opposed ends of the front guide pin 8f and the rear guide pin 5d are spaced-apart from each other.

Additionally, since the front guide pin 8f and the rear guide pin 5d are formed integrally with the second lens group moving frame 8 and the shutter stopper member 5, respectively, the use of such integrally-formed guide pins is advantageous with respect to the production cost as compared with the use of metal guide shafts or pins provided as separate members from the second lens group moving frame 8 and the shutter stopper member 5.

Although the present invention has been discussed based on the present embodiment described with reference to the attached drawings, the present invention is not limited to this particular embodiment. For instance, although the front pin support hole 100c and the rear pin support hole 100d are formed in the shutter unit 100 while the front guide pin 8f and the rear guide pin 5d are formed on the second lens group moving frame 8 and the shutter stopper member 5 that are positioned on the front and the rear of the shutter unit 100 in the above illustrated embodiment, respectively, the arrangement of these guide pins and the pin support holes is reversible.

In addition, the front guide pin 8f and the rear guide pin 5d are coaxially arranged in the above illustrated embodiment, and this coaxial arrangement is effective at preventing the shutter unit 100 from tilting. However, it is possible for the front and rear guide pins to be arranged so as not to be coaxial with each other as long as a sufficient accuracy for supporting the shutter unit 100 can be achieved.

Additionally, although the shutter unit 100 is prevented from further moving rearward from the rear moving limit thereof by making the first rear projection 100n of the shutter unit 100 come in contact with the front projection 23a of the image pickup device holder 23 in the above illustrated embodiment, a portion of the shutter unit 100 which prevents the shutter unit 100 from further moving rearward from the rear moving limit thereof is not limited to the first rear projection 100n and can be any other rear portion of the shutter unit 100.

In addition, although the shutter unit 100 is biased rearwards in the optical axis direction, and abuts against a rear member (the front projection 23a of the image pickup device holder 23) to shift the position of the shutter unit 100 forward in the shutter unit accommodation space 8e relative to the second lens group moving frame 8 when the zoom lens barrel 70 is accommodated in the above described embodiment, this configuration can be reversed in the present invention. Namely, it is possible for a light quantity control unit corresponding to the shutter unit 100 to be biased toward the front in the optical axis direction, and that the light quantity control unit to move away from a front support member against the biasing force to approach a rear support member when the zoom lens barrel 70 is accommodated. In short, the support structure for the light quantity control unit is sufficient so long as a reduction in length of the lens barrel can be achieved by movement of the light quantity control member holding frame relative to the front and rear support members.

In addition, although an example in which a shutter unit including shutter blades (light quantity control members) is adopted as a light quantity control unit is shown in the above illustrated embodiment, the light quantity control members in the present invention are not limited solely to shutter blades. For instance, a member or members for controlling the quantity of transmitted light such as a set of diaphragm blades or an ND filter can be adopted.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A support structure for a light quantity control unit of a lens barrel, comprising:
   a holding frame which holds a light quantity control member;
   a front support member and a rear support member positioned in front of and behind said holding frame, respectively, a distance between said front support member and said rear support member in an optical axis direction being fixed;
   a front guide pin and a front pin support hole which are formed on one and the other of said holding frame and said front support member, said front guide pin extending in said optical axis direction and being slidably inserted into said front pin support hole; and
   a rear guide pin and a rear pin support hole which are formed on one and the other of said holding frame and said rear support member, said rear guide pin extending in said optical axis direction and being slidably inserted into said rear pin support hole,
   wherein said holding frame is supported by said front guide pin, said front pin support hole, said rear guide pin and said rear pin support hole to be movable in said optical axis direction relative to said front support member and relative to said rear support member.

2. The support structure according to claim 1, wherein said front support member comprises a forward movement limit portion which limits forward movement of said holding frame,
   wherein said rear support member comprises a rearward movement limit portion which limits rearward movement of said holding frame,
   wherein said front guide pin and said rear guide pin project from said forward movement limit portion and said rearward movement limit portion, respectively, and
   wherein said front pin support hole and said rear pin support hole are formed in said holding frame.

3. The support structure according to claim 1, wherein said front guide pin and said rear guide pin are coaxial with each other.

4. The support structure according to claim 3, wherein said holding frame includes a through-hole which extends through said holding frame in said optical axis direction, said front pin support hole and said rear pin support hole being formed as part of said through-hole.

5. The support structure according to claim 1, wherein said front support member holds a lens group,
   wherein said holding frame is located at a position whereby said light quantity control member is positioned away from said lens group in said optical axis direction when said lens barrel is in an operating state in which a photographing operation is possible, and
   wherein said holding frame is moved to a position whereby said light quantity control member lies in a plane orthogonal to said optical axis in which at least part of said lens group lies when said lens barrel moves from said operating state to a lens barrel accommodated state in which a photographing operation is not possible.

6. The support structure according to claim 5, further comprising a biasing device which biases said holding frame toward said rear support member, wherein, when said lens barrel moves from said operating state to said lens barrel accommodated state, said front support member and said rear support member move rearward in said optical axis direction, and said holding frame comes into contact with a rear member provided behind said rear support member so that said holding frame is prevented from further moving rearward so as to be closely approached by said front support member against a biasing force of said biasing device during the course of said rearward movement of said front support member and said rear support member.

7. The support structure according to claim 1, further comprising a biasing device which biases said holding frame toward one of said front support member and said rear support member, and wherein, when said lens barrel moves from an operating state in which a photographing operation is possible to a lens barrel accommodated state in which a photographing operation is not possible, said holding frame moves in a direction opposite to a biasing direction of said biasing device against a biasing force of said biasing device.

8. The support structure according to claim 1, wherein said lens barrel is a retractable zoom lens barrel.

9. The support structure according to claim 4, wherein opposite end openings of said through-hole are formed as divergent openings, diameters of the divergent openings increase in directions away from each other in said optical axis direction, respectively.

10. The support structure according to claim 1, wherein said front support member and said rear support member comprise separate members which are fixed to each other by a set screw.

11. A supporting structure for supporting a holding frame which holds a light quantity control member of a lens barrel in a manner to allow said holding frame to move in an optical axis direction relative to a lens group holding member, said supporting structure comprising:

a movement limit member which is fixed to said lens group holding member and limits movement of said holding frame in a direction away from said lens group holding member in said optical axis direction;

a first guide pin provided on one of said holding frame and said lens group holding member, said first guide pin being slidably inserted into a first pin support hole provided in the other of said holding frame and said lens group holding member; and a second guide pin provided on one of said holding frame and said movement limit member, said second guide pin being slidably inserted into a second pin support hole provided in the other of said holding frame and said movement limit member, wherein said holding frame is supported by said lens group holding member via said first guide pin and said first pin support hole and said holding frame is supported by said movement limit member via said second guide pin and said second pin support hole into which said second guide pin is slidably inserted, so that said holding frame is movable in said optical axis direction relative to said lens group holding member and relative to said movement limit member.

12. A supporting structure for supporting a holding frame which holds a light quantity control member of a lens barrel in a manner to allow said holding frame to move in an optical axis direction relative to a lens group holding member, wherein said supporting structure comprises a movement limit member which is fixed to said lens group holding member and limits movement of said holding frame in a direction away from said lens group holding member in said optical axis direction, and wherein said holding frame is supported by each of said lens group holding member and said movement limit member to be movable in said optical axis direction relative to the movement limit member via a combination of a guide pin and a pin support hole into which said guide pin is slidably inserted, respectively.

13. The support structure for a light quantity control unit of a lens barrel according to claim 1, a first distance provided between surfaces of the front support member and the holding frame having the front guide pin and the front pin support hole and a second distance provided between surfaces of the rear support member and the holding frame having the rear guide pin and the rear pin support hole, said first distance being greater than said second distance in an operating state in which a photographing operation is possible, said first distance being smaller than said second distance in an accommodation state in which a photographing operation is not possible.

14. The support structure for a light quantity control unit of a lens barrel according to claim 1, the lens barrel being movable between an operation state in which a photographing operation is possible and an accommodation state in which a photographing operation is not possible, said holding frame being moved to be close to the front support member in the accommodation state and to be close to the rear support member in the operation state.

15. The support structure for a light quantity control unit of a lens barrel according to claim 1, the lens barrel being movable between an operation state in which a photographing operation is possible and an accommodation state in which a photographing operation is not possible, at least one point on the front support member that is behind of, in the optical axis direction, at least one corresponding point on the holding frame, in the accommodation state, is in front of the at least one corresponding point on the holding frame, in the operation state.

16. The supporting structure for supporting a holding frame which holds a light quantity control member of a lens barrel according to claim 12, said lens barrel being movable between an operation state in which a photographing operation is possible and an accommodation state in which a photographing operation is not possible, said holding frame being moved to be close to the lens group holding member in the accommodation state and to be close to the movement limit member in the operation state.

17. The supporting structure for supporting a holding frame which holds a light quantity control member of a lens barrel according to claim 11, said lens barrel being movable between an operating state in which a photographing operation is possible and a lens barrel accommodation state in which a photographing operation is not possible, said holding frame being movable to be close to the lens group holding member in the accommodation state and to be close to the movement limit member in the operation state.

18. The support structure for a light quantity control unit of a lens barrel according to claim 1, wherein said front guide pin is movable with respect to said front pin support hole and said rear guide pin is movable with respect to said rear pin support hole in accordance with movement of said holding frame along said optical axis.

19. The support structure for a light quantity control unit of a lens barrel according to claim 1, wherein said front support member supports a lens for movement along the optical axis.

20. The supporting structure for supporting a holding frame according to claim 12, wherein said holding frame is also supported to be movable in the optical axis direction relative to the lens group holding member.

* * * * *